US007677661B1

(12) United States Patent
Ferrari-Cicero et al.

(10) Patent No.: US 7,677,661 B1
(45) Date of Patent: *Mar. 16, 2010

(54) PAD FOR CHILD SAFETY SEAT

(76) Inventors: Brigitte Ferrari-Cicero, 2881 Meadowcrest Dr., Yorktown Heights, NY (US) 10598; Marlene Murphy, 105 Chelsea La., Wilmington, NC (US) 28409

(*) Notice: Subject to any disclaimer, the term of this patent is extended or adjusted under 35 U.S.C. 154(b) by 0 days.

This patent is subject to a terminal disclaimer.

(21) Appl. No.: 12/168,710

(22) Filed: Jul. 7, 2008

Related U.S. Application Data

(63) Continuation-in-part of application No. 11/462,605, filed on Aug. 4, 2006, now Pat. No. 7,410,213.

(60) Provisional application No. 60/705,754, filed on Aug. 5, 2005.

(51) Int. Cl.
*A47C 31/11* (2006.01)

(52) U.S. Cl. .................................. 297/219.12

(58) Field of Classification Search .............. 297/219.12
See application file for complete search history.

(56) References Cited

U.S. PATENT DOCUMENTS

| 4,883,701 | A | * | 11/1989 | Rankin et al. ........... 297/219.12 X |
| 4,885,200 | A | * | 12/1989 | Perdelwitz et al. .. 297/219.12 X |
| 4,891,454 | A | * | 1/1990 | Perdelwitz et al. .. 297/219.12 X |
| 4,892,769 | A | * | 1/1990 | Perdelwitz et al. .. 297/219.12 X |
| 5,662,380 | A | * | 9/1997 | Tam et al. ............. 297/219.12 X |
| 5,735,576 | A | * | 4/1998 | Pepys et al. ........... 297/219.12 X |
| 5,988,744 | A | * | 11/1999 | Franchak ............... 297/219.12 X |
| 6,224,152 | B1 | * | 5/2001 | Hughes et al. ......... 297/219.12 X |
| 6,394,543 | B1 | * | 5/2002 | Dunne et al. ........... 297/219.12 |
| 6,454,352 | B1 | * | 9/2002 | Konovalov et al. ..... 297/219.12 |
| 6,655,734 | B2 | * | 12/2003 | Hunter et al. .......... 297/219.12 X |
| 6,702,381 | B2 | * | 3/2004 | Endicott et al. ....... 297/219.12 X |
| 6,752,457 | B2 | * | 6/2004 | Gold et al. ............ 297/219.12 |
| 6,851,750 | B2 | * | 2/2005 | Sampson et al. ...... 297/219.12 X |
| 6,860,555 | B2 | * | 3/2005 | Kassai et al. .......... 297/219.12 |
| 6,926,359 | B2 | * | 8/2005 | Runk .................... 297/219.12 |
| 6,929,326 | B2 | * | 8/2005 | Cohen-Fyffe .......... 297/219.12 |
| 6,948,725 | B2 | * | 9/2005 | Sampson et al. ...... 297/219.12 X |
| 7,281,285 | B2 | * | 10/2007 | Zucker et al. ......... 297/219.12 X |
| 7,410,213 | B1 | * | 8/2008 | Ferrari-Cicero et al. 297/219.12 |
| 7,537,284 | B1 | * | 5/2009 | Antorcha .............. 297/219.12 |
| 2001/0048235 | A1 | * | 12/2001 | Hartranft .............. 297/219.12 |
| 2004/0090097 | A1 | * | 5/2004 | Bugher ................. 297/228.1 |
| 2004/0145224 | A1 | * | 7/2004 | Kassai et al. .......... 297/219.12 |
| 2004/0207239 | A1 | * | 10/2004 | King ..................... 297/219.12 |
| 2004/0239163 | A1 | * | 12/2004 | Runk .................... 297/219.12 |
| 2004/0245819 | A1 | * | 12/2004 | Bugher ................. 297/219.12 |
| 2005/0110315 | A1 | * | 5/2005 | Littlehorn et al. ..... 297/219.12 |

* cited by examiner

*Primary Examiner*—Rodney B White
(74) *Attorney, Agent, or Firm*—Elizabeth Herbst Schierman; Dykas, Shaver & Nipper, LLP

(57) ABSTRACT

A child safety seat pad having a bottom seat portion and a back portion is configured to cover the exposed child contact areas of a safety seat and is releasably secured to the seat by fasteners. Perforation lines or slits in the seat back portion connect to perforations lines or slits in the bottom seat portion of the pad. These may be opened to provide apertures for connecting safety harness webbing to safety seat anchor points. A smaller pad is provided for inclusion in the bottom seat portion.

19 Claims, 11 Drawing Sheets

PAD FOR CHILD SAFETY SEAT

CROSS-REFERENCE TO RELATED APPLICATIONS

This application is a continuation-in-part application of U.S. application Ser. No. 11/462,605, filed Aug. 4, 2006, entitled Absorbent Pad for Child Safety Seat, which is pending and claims the benefit of U.S. provisional application Ser. No. 60/705,754, filed Aug. 5, 2005, both of which are incorporated herein by this reference.

FIELD OF THE INVENTION

The present invention relates generally to children's safety seats for vehicular use and more specifically to an absorbent pad for covering same.

BACKGROUND OF THE INVENTION

The employment of restraints for children riding in vehicles has become mandatory throughout the United States. Among the types of restraints available are infant carrier/car seats, which have been designed for transporting infants from birth up to approximately one year of age. Infant carrier/car seats are required to be installed only in the rear seat of a vehicle and include a harness having shoulder straps that are engaged through the rear of the safety seat back and a chest clip for gathering and positioning the shoulder straps. The harness additionally includes lap straps and a center crotch buckle.

Further child restraints have been categorized as convertible car seats, which are employed in both rear-facing and forward-facing positions for children exceeding certain weights, but who are within the weight, height, or age requirements for mandatory usage of child restraints.

A third category of child restraints are booster seats, which elevate a child to a level for use of a conventional seat belt and shoulder restraint. Booster seats are available with a unitary seat and back as well as with a seat bottom only.

As used hereinafter, the term "safety seat" shall be interpreted as to include all of the foregoing child restraints.

Virtually all safety seats include cushions covering child contact surfaces, e.g., the back-, bottom-, and inwardly-facing contoured sides of the seat, so as to provide comfort and a harness having three- or five-point anchor contacts with the seat frame. Openings are formed in the seat cushions through which the harness webbing passes at each of the three or five contact points, as well as additional sets of openings for the seat back contact points to enable adjustment of the shoulder webbing portions of the harness.

Children using safety seats are prone to soiling the seat cushions, often because of spilling or dripping liquid or due to diaper leakage. While some cushions include a liquid-impervious outer layer, so that they may be wiped, such cushions are generally uncomfortable for children, since the cushion's contact surface does not allow air or liquids to pass through. Further, since the spilled liquids are not absorbed in the cushion, they tend to migrate beyond the cushion, wetting the child's clothing, as well as the safety seat frame and the vehicle upholstery.

Additionally, the removal of soiled cushions for washing proved to be a difficult and time consuming task.

Previous attempts to provide linings for safety seats have been rather complex to install and to remove and are not designed to be used with shoulder straps that protrude from the safety seat at non-traditional locations. Additionally, the complexity of prior linings has made disposal of the linings after a soiling impractical.

For example, the seat cover disclosed in U.S. Pat. No. 6,926,359, facilitates installation and removal of the lining from a safety seat having shoulder straps that coordinate with one of three side slots. Removal requires removing each strap from one of the side slots. Further, the cover is not readily disposable, due to cost considerations.

Likewise the infant car seat liner disclosed in U.S. Pat. No. 4,883,701 utilizes side slots for installing and removing the liner around shoulder straps. Again, the shoulder straps of the safety seat must coordinate with these side slots for the liner to fit properly on the safety seat. Further, the entire seat liner must be disposed of in the event of a soiling.

The disposable seat liner disclosed in the U.S. Pat. No. 4,885,200, like the covers and liners described in the aforementioned patents, uses side slots for installing and removing the liner around the shoulder straps, which limits the should-strap configurations with which the liner will fit properly. Also, the entire liner must be disposed in the event of a soiling.

SUMMARY OF THE INVENTION

Embodiments of the present child safety seat pad or liner provide for quick installation and removal, disposability in total or in part, and are useable with child safety seats having shoulder harnesses at any height along the back of the seat.

The pad includes a bottom seat portion and a back seat portion. Parallel lines of perforations or slits are included in the back seat portion, and the lines join diverging lines of perforations or slits in the bottom seat portion. The lines may be opened to allow the shoulder harness webbing to pass through from the safety seat. The bottom seat portion further includes a buckle opening through which the buckle of the harness may pass.

In certain embodiments, lateral bolster flaps are included on the sides of the bottom seat portion and back seat portions. The lateral bolster flaps overlap the sides of the child safety seat. The flaps include fasteners that act to secure the pad in place and to keep the flaps in place along the contour of the outer shell of the child safety seat. Thus, the pad is configured to cover the exposed child contact areas of a safety seat, and to overlie the sides, top, front, and back portions of the safety seat, and to be releasably secured thereto with contact- or pressure-sensitive adhesives.

Also, in some embodiments the entire pad may be disposable such that the bottom seat portion includes a durable yet liquid-permeable outer layer, an absorbent core, and liquid impervious layer having adhesive or other fasteners attached thereto to assist in positioning the pad on the child safety seat.

In still further embodiments, the pad includes a smaller pad, which is either disposable or washable and which is particularly useful in situations in which a spill soils only a small portion of a pad. The smaller pad likewise is placed on top of the pad, itself, but may alternatively be placed directly on the child safety seat. The smaller pad has a pad bottom portion and lateral flaps. In the disposable version, perforations are included that may be opened to provide an opening for passage of the buckle and its tether. In the washable version, a buckle pad opening or slit is provided. In either version, a flap lays over the perforations or the buckle opening so as to discourage any liquid spilled from passing through the opening or slit to the pad below. In the event of a spill in the bottom seat area, only the smaller pad need be removed and either washed or replaced.

From the foregoing compendium, it will appreciated that is an aspect of the present invention to provide a child safety seat pad of the general character described that is not subject to the disadvantages of the antecedents of the invention aforementioned.

It is a feature of the present invention to provide a child safety seat pad of the general character described that is simple to use.

A consideration of the present invention is to provide a child safety seat pad of the general character described which is relatively low in cost.

Another aspect of the present invention is to provide a child safety seat pad of the general character described that may be applied over an existing child safety seat cushion and prevents the cushion from becoming soiled.

Another feature of the present invention is to provide a child safety seat pad of the general character described that is suitable for manufacture by economical mass production fabrication.

Another consideration of the present invention is to provide a child safety seat pad of the general character described which assures a child's comfort during travel.

A still further aspect of the present invention is to provide a child safety seat pad of the general character described that is well suited for usage by all children whose weight, height, and/or age qualifies for mandatory safety seat usage.

A further consideration of the present invention is to provide a disposable or washable child safety seat pad of the general character described that readily absorbs spilled liquids or diaper leakage.

Yet another feature of the present invention is to provide a child safety seat of the general character described which is durable for extended usage and need be replaced or washed only when soiled.

To provide a child safety seat pad of the general character described that is both safe and efficacious is a still further consideration of the present invention.

Other aspects, features and considerations of the present invention in part will be obvious and in part will be pointed out hereinafter.

With these ends in view, the invention finds embodiment in the various combinations of elements, arrangements of parts and series of steps by which the said aspects, features and considerations aforementioned and certain other aspects, features and considerations are attained, all with reference to the following description and drawings and the scope of which will be more particularly pointed out and indicated in the appended claims.

The purpose of the foregoing Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out the invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF THE DRAWINGS

It should be noted that in the drawings, which are to be briefly described hereinafter, for clarity of illustration and understanding, elements of the figures have not necessarily been drawn to scale and certain elements have been omitted.

DESCRIPTION OF THE PREFERRED EMBODIMENTS

Figure 1:
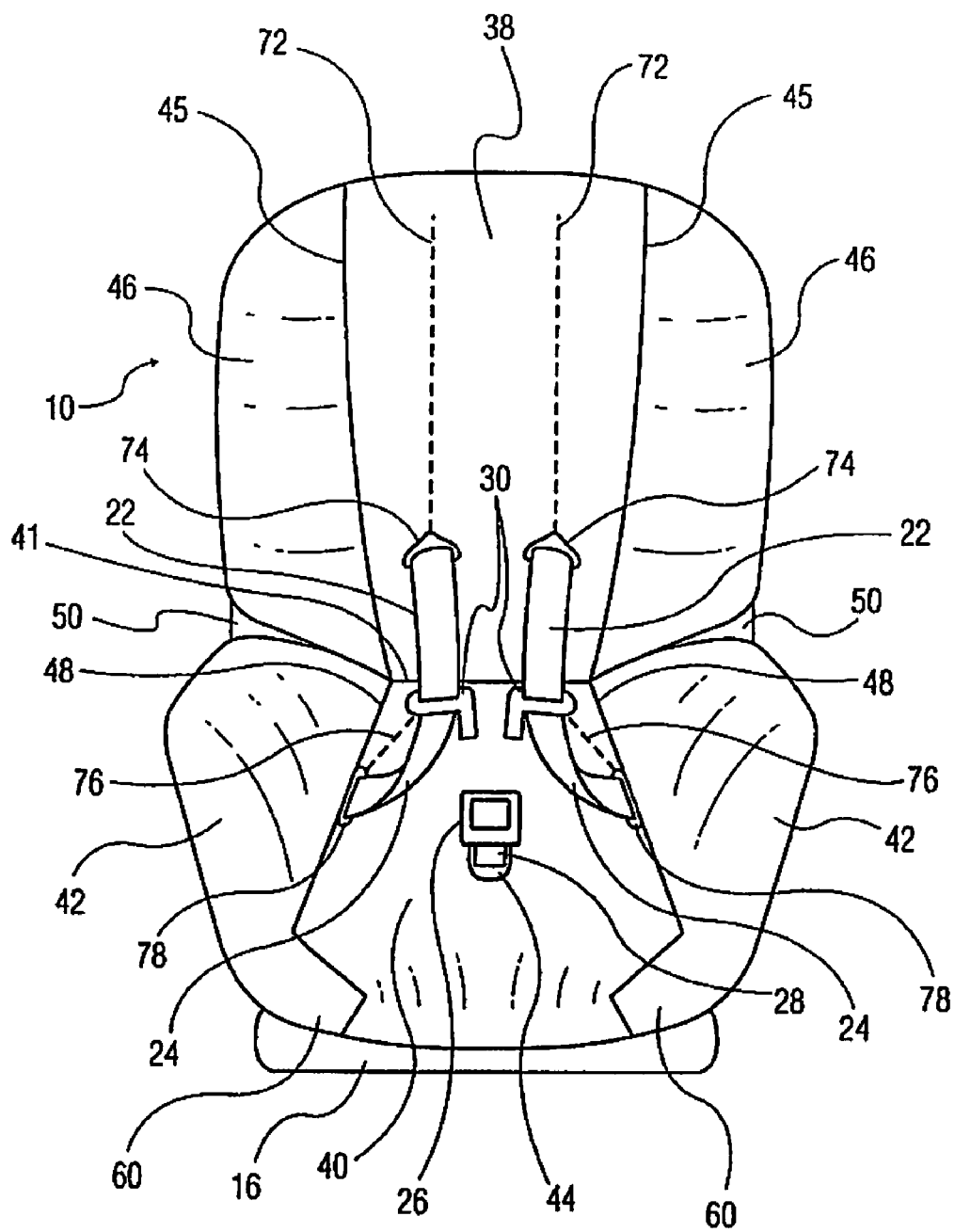
FIG. 1 is a front perspective view of a pad for a child safety seat according to a first embodiment positioned on a child safety seat.

While the pad for the child safety seat is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Referring now in detail to the drawings, the pad or liner 10 is configured to be applied over any of a variety of conventional child safety seats, i.e. for universal fit. A typical child safety seat 12 includes an outer shell 14, a seat base 16, a seat cushion 18, and a harness 20, having shoulder webbing portions 22 as well as lap webbing portions 24.

The harness 20 additionally includes a buckle 26 joined to a buckle tether 28, which extends through the seat bottom. A pair of buckle clips 30 are engageable in the buckle 26 and serve to separate the shoulder webbing portion 22 of the harness 20 from the lap webbing portion 24. Also employed in conjunction with the harness 20 is a chest clip that is not illustrated.

The seat cushion 18 includes a seat back, which is provided with a plurality of pairs of spaced openings 32, 34 and 36. The shoulder webbing 22 extends through a selected pair of the openings 32, 34, 36 and is anchored through registered back openings in the child safety seat frame. Adjustment of the length of the shoulder webbing 22 is achieved by selecting the appropriate sets of openings for anchoring the shoulder webbing 22. Though the typical child safety seat 12 includes only select openings for anchoring the shoulder webbing 22, the pad or liner 10 is also useful with a more unusual child safety seat that has height-adjustable shoulder webbing anchors.

Figure 2:
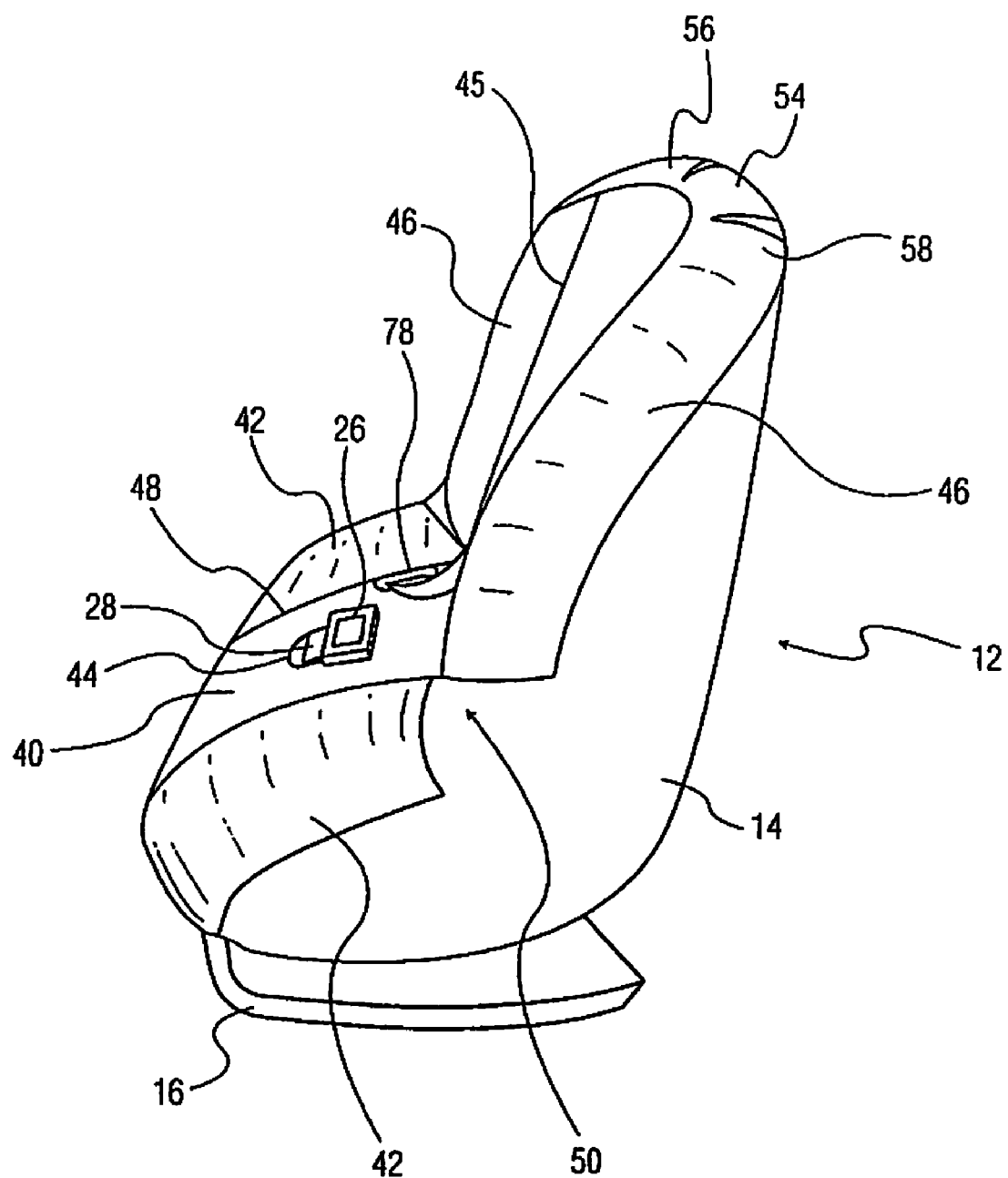
FIG. 2 is a side perspective view of the child safety seat and the pad according to the first embodiment.
Figure 3:
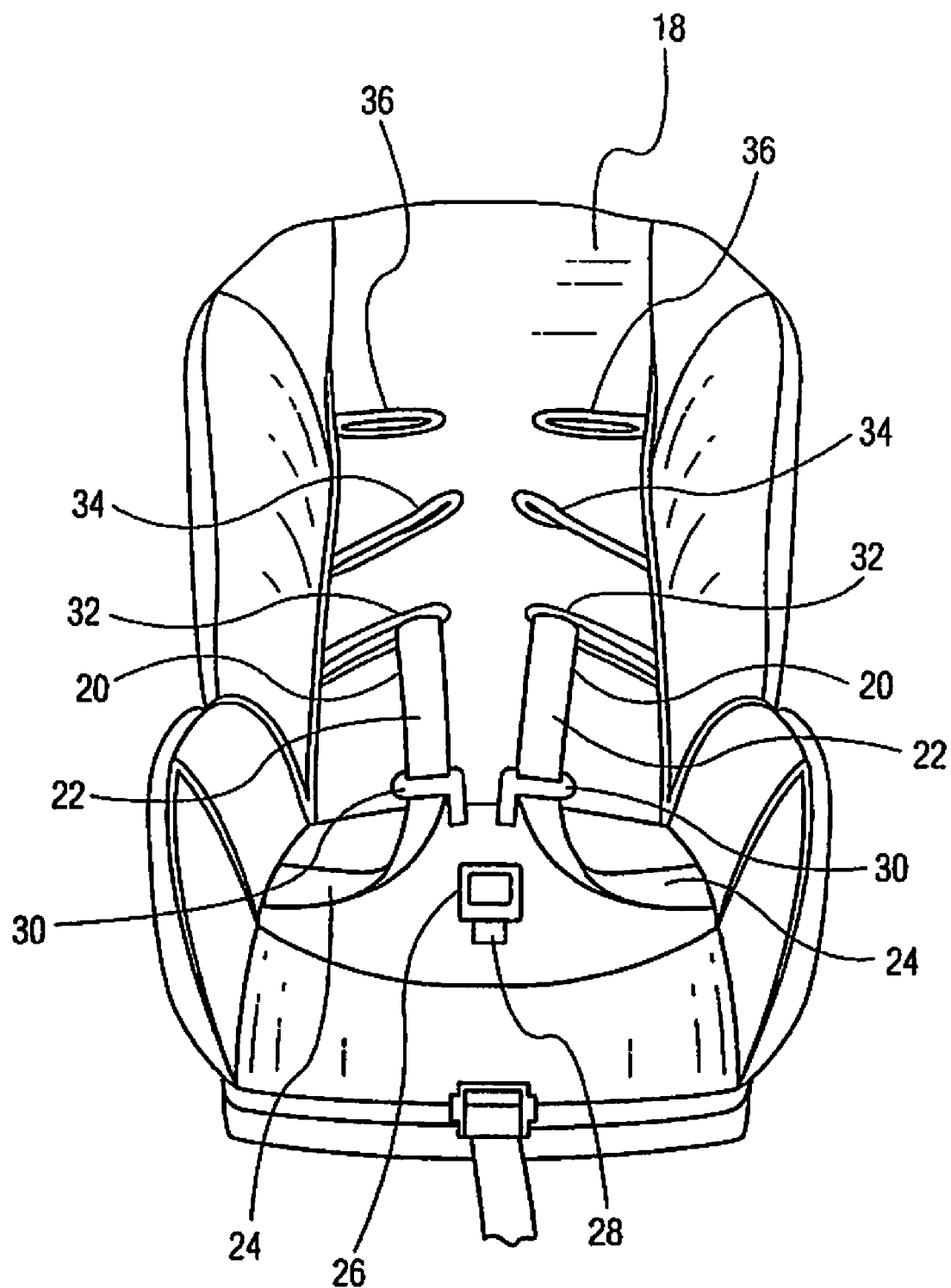
FIG. 3 is a front perspective view of the child seat depicted in FIG. 1, prior to placement of the pad and showing a conventional seat cushion.
Figure 5:
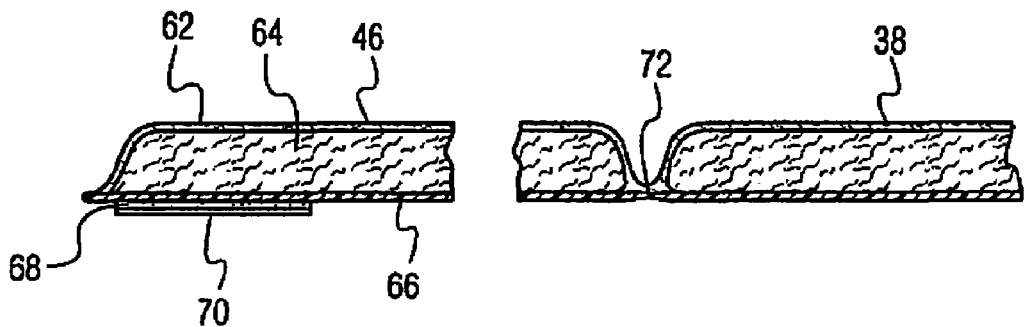
FIG. 5 is a greatly enlarged fragmentary sectional view through the pad, the same being taken substantially along the line 5-5 in FIG. 5 and showing an absorbent core sandwiched between a durable porous liquid permeable outer layer and a liquid impervious base layer with peripheral portions of the liner overlaid with adhesive strips and also showing a separable perforation in the pad.
Figure 6:
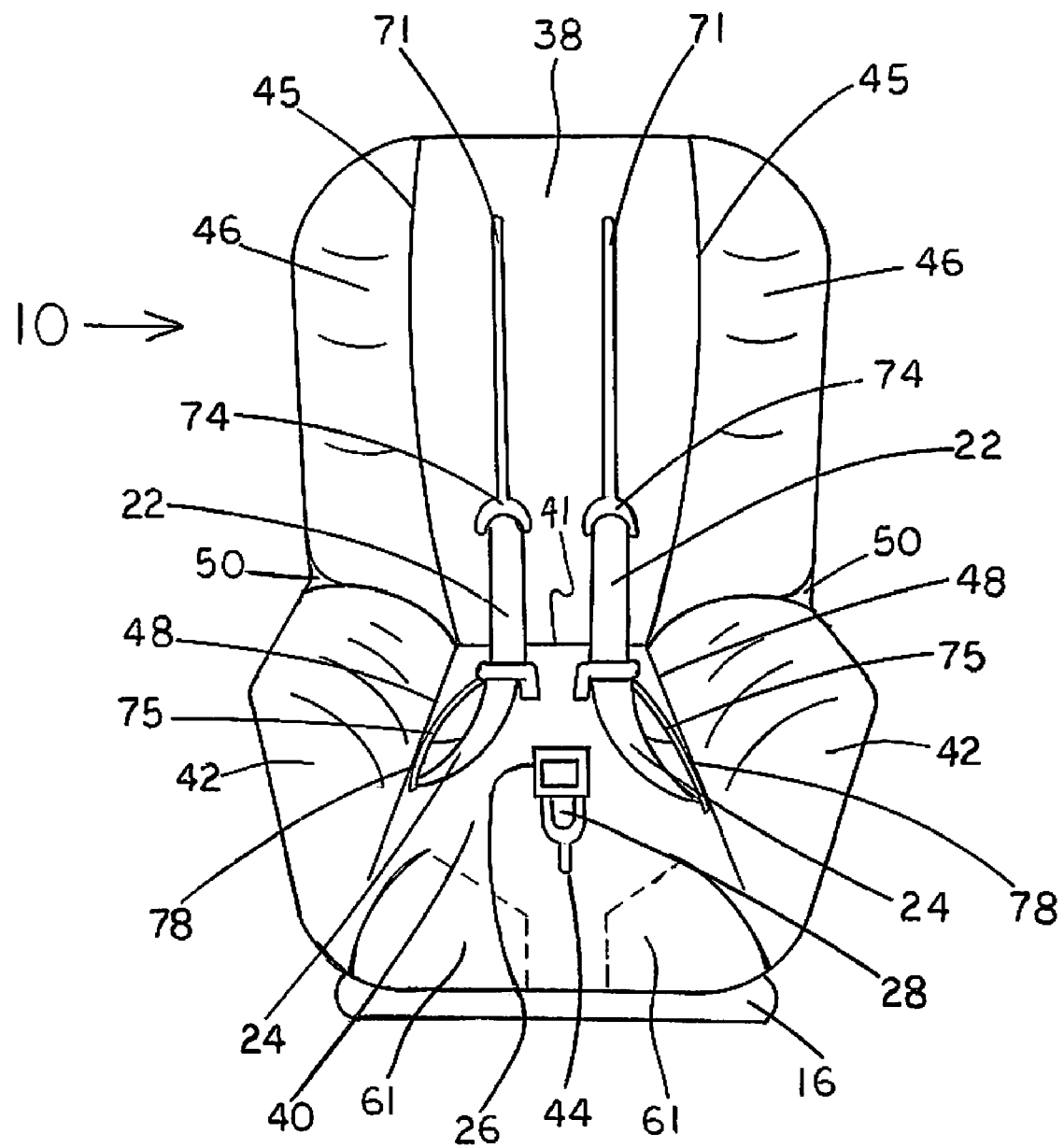
FIG. 6 is a front perspective view of a pad or liner for a child safety seat according to a second embodiment positioned on a child safety seat.
Figure 7:
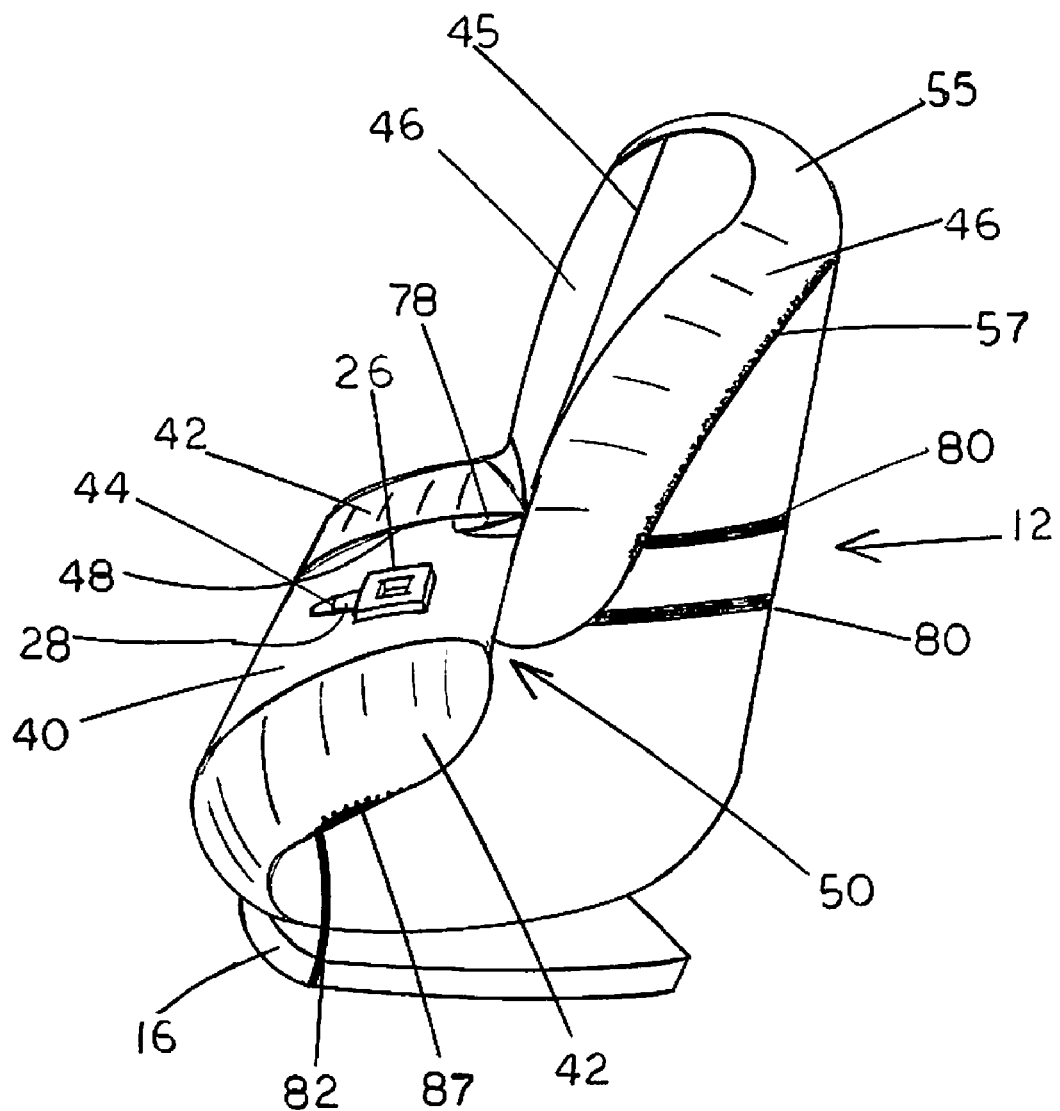
FIG. 7 is a side perspective view of the child safety seat and the pad or liner according to the second embodiment.

With attention now directed to FIGS. 1, 2 and 5, it should be noted that, pursuant to the first embodiment of the pad or liner 10, the pad 10 is a disposable absorbent pad that includes a seat back portion 38 and a seat bottom portion 40. An optional seam or fold line 41 may define the boundary between the seat back portion 38 and the seat bottom portion 40. Projecting from the sides of the seat bottom portion 40 are outwardly-extending bottom lateral side bolster flaps 42. A crotch area seat belt tether opening 44 is provided through the seat bottom portion 40.

The seat back portion 38 includes outwardly-extending lateral side bolster flaps 46. An optional seam or fold line 45 may define the boundary between each flap 46 and the seat back portion 38. A "V" shaped cutaway notch 50 is provided between the bolster flaps 42, 46, so that the flaps will lie against the corresponding areas of the outer shell 14 without doubling over on themselves, as will be noted from an examination of FIG. 2.

Figure 4:
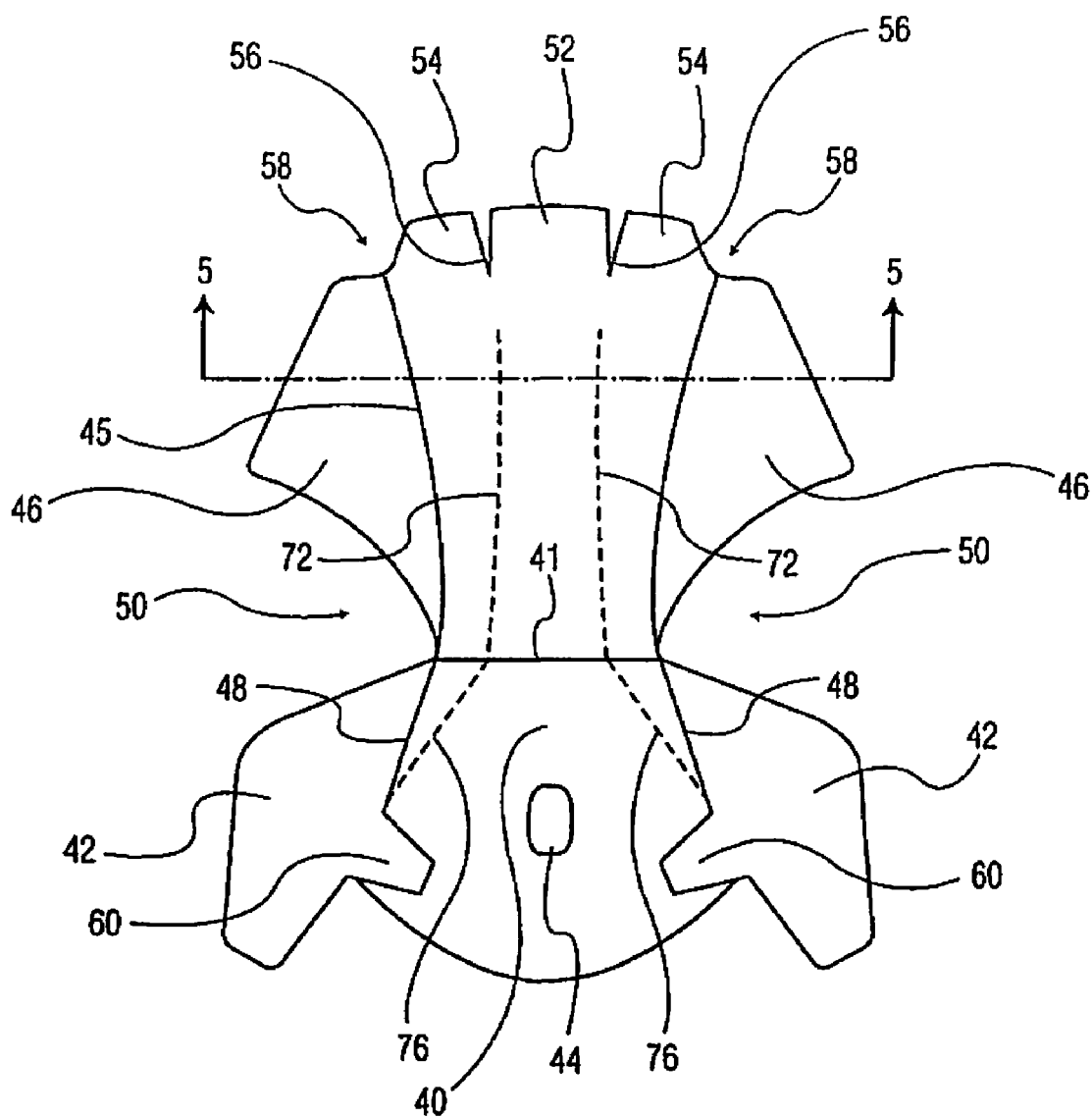
FIG. 4 is a plan view of the pad for a child safety seat according to the first embodiment.

It should also be noted that the overall plan configuration of the disposable absorbent pad 10 according to the first embodiment, as illustrated in FIG. 4, when lying flat, is similar to an hour glass or that of a splayed fowl. Projecting beyond the seat back portion 38 is a central seat top overwrap 52 and a pair of adjacent seat top overwraps 54, which are separated from the central overwrap 52 by a pair of "V" shaped cutaway notches 56, so that the overwraps 52, 54 will lie against the corresponding areas of the outer shell 14, adapting to the curved contour thereof, without doubling over on themselves, as can be observed in FIG. 2.

For the same purpose, there is provided a pair of corner cutouts 58, which separate the overwraps 54 from their adjacent respective bolster flaps 46, to permit the flaps and overwraps to conform to the contour of the outer shell 14.

An inwardly-directed overwrap 60 extends from the approximate mid length of each bottom lateral side bolster flap 42 and overlies a portion of the front of the seat bottom portion 40, as illustrated in FIG. 1. The overwraps 60 project beyond optional fold lines 48, which separate the seat bottom portion 40 from the bottom lateral side bolster flaps 42.

As shown FIG. 5, the pad 10 according to the first embodiment, having a thickness in the order of 2 mm to 10 mm, is comprised of an outer durable, yet liquid-permeable layer 62, an absorbent core 64 and a base layer 66 formed of flexible liquid-impermeable thermoplastic film. The peripheral edges of the disposable absorbent pad 10, wherein the layer 62 joins the base layer 66, are suitably bonded.

The absorbent core may be comprised of any conventional absorbent fill material, for example, the absorbent materials disclosed in U.S. Pat. No. 7,071,423, U.S. Pat. No. 6,727,403, or an absorbent material comprising a gel such as that disclosed in U.S. Pat. No. 6,930,221, all of which are incorporated herein by reference. Further, the permeable layer 62 may comprise, by way of example only, a cover sheet such as that disclosed in U.S. Pat. No. 7,005,558, incorporated herein by reference.

There is provided on the base layer 66, adjacent the peripheral areas of the bolster flaps 42, 46, as well as the overwraps 52, 54 and 60, and/or any other areas of the base layer 66, a suitable fastener for releasably securing the pad 10 to the child safety seat 12, such as a strip 68 of contact or pressure sensitive adhesive or a hook and loop tape fastener strip, with mating strips secured to the seat 12, or a snap or magnetic fastener. A release tape 70 may overlie strips 68 comprising a contact or pressure sensitive adhesive until such time as the pad 10 is positioned for usage.

It should also be noted that a pair of substantially-parallel lines of perforations 72 extend down the seat back portion 38. When installing the pad 10, the perforations 72 are separated to provide apertures 74 registered with the pair of openings 32, 34 or 36 which are currently in use. The parallel lines of perforations 72 extend to the juncture of the seat back 38 and the seat bottom 40, from which point a pair of divergent lines of perforations 76 extend forwardly across the seat bottom portion 40. The perforations 76 are separated to provide apertures 78 through which the lap webbings 24 extend.

Further, for quick removal of a pad 10 that has been soaked with liquid, one need only pull apart, i.e., separate, the lines of perforations 72, 76 in their entirety, without disconnecting the harness attachments.

If desired, one may attach the pad 10 to the seat 12 by opening the entire lines of perforation 72, 76 and passing the harness webbing through to the liquid permeable layer side of the pad, without forming the specific apertures 74, 78 for the webbing anchor points.

Further, for quick removal of a pad 10 that has been soaked with liquid, one need only pull apart, i.e., separate, the lines of perforations 72, 76 in their entirety, without disconnecting the harness to safety seat connections. If desired, one may position a fresh pad 10 by opening the entire lines of perforation 72, 76 to form a single continuous slit and pulling the harness webbing through the slit, without forming specific openings and threading the webbing through such openings.

It should also be appreciated that the pad 10 may be configured with a seat bottom portion 40 and associated bottom lateral side bolsters 42, omitting the seat back portion 38. In such instance, the line 41 comprises the peripheral edge of the pad 10.

Thus, according to the first embodiment, there is provided a pad that is fully disposable, easy to install and remove, and is conducive to use with child safety seats with shoulder harness anchors at any height in the seat back area.

A second embodiment of the pad or liner 10 is shown in FIGS. 6 through 10. Preferably, the pad or liner 10 of the second embodiment is made of a washable fabric. Accordingly, the pad 10 according to the second embodiment provides a washable and reusable alternative to the fully-disposable pad 10 according to the first embodiment. In some embodiments the pad 10 according to the second embodiment includes a washable outer layer with a liquid-impermeable inner layer.

The pad or liner 10 of the second embodiment likewise includes a seat back portion 38 and a seat bottom portion 40 with an optional seam or fold line 41 that may define the boundary between the seat back portion 38 and the seat bottom portion 40. It also likewise has, projecting from the sides of the seat bottom portion 40, outwardly-extending bottom lateral side bolster flaps 42. It further includes the crotch area seat belt tether opening 44 through the seat bottom portion 40. Preferably, the pad 10 is made up of layers of material including a liquid-permeable outer layer, an absorbent inner layer of cloth or batting, and a water-resistant base layer. It is particularly preferred that the seat bottom portion 40 have such layering.

Figure 9:
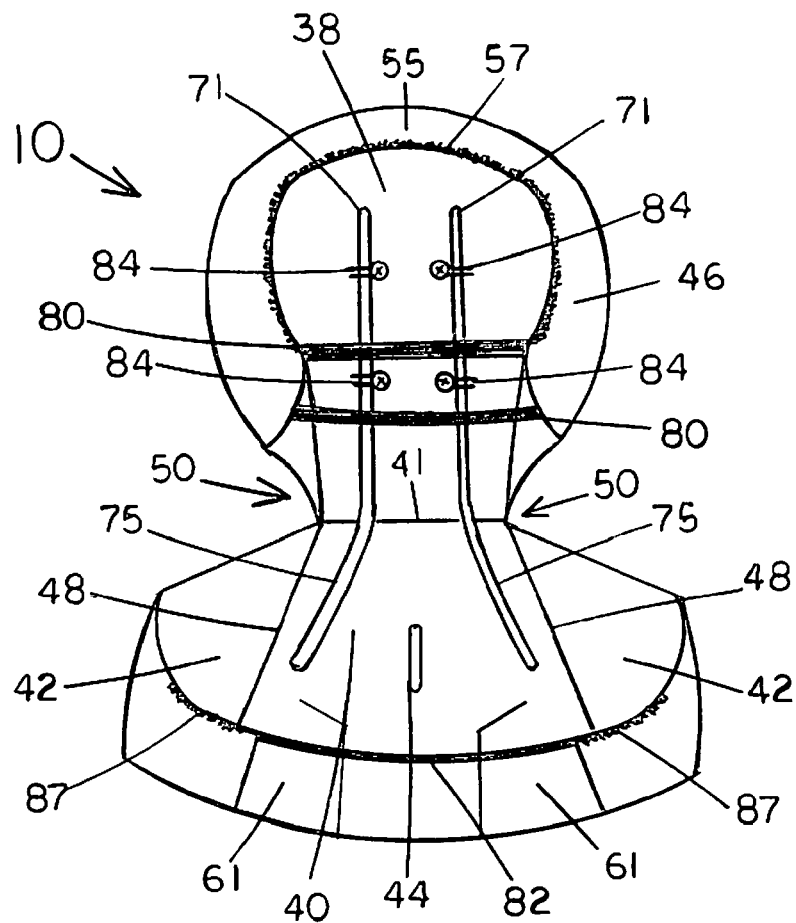
FIG. 9 is a back plan view of the pad or liner according to the second embodiment.

The seat back portion 38 also includes the outwardly-extending lateral side bolster flaps 46 and an optional seam or fold line 45 that may define the boundary between each flap 46 and the seat back portion 38. Also as in the first embodiment, a "V" shaped cutaway notch 50 is provided between the bolster flaps 42, 46, so that the flaps will lie against the corresponding areas of the outer shell or back 14 of the child safety seat 12 without doubling over on themselves, as will be noted from examination of FIG. 7. As shown in FIG. 9, portions of the peripheral edges of the bolster flaps 42, 46 are preferably gathered by a side bolster flap gathering 87 and a top overwrap gathering 57, respectively, as by inclusion of elastic along the edge, so as to encourage the flaps to adapt closely to the contours of the child safety seat's outer shell 14 and to encourage the pad 10 to stay in place on the seat 12.

Back attachment straps 80, such as elastic straps, which act as fasteners, are attached at the edge of the lateral side bolster flaps 46 and connect the edge of one lateral side bolster flap 46 to the edge of the opposite lateral side bolster flap 46. Accordingly, when the pad or liner 10 is in place on the child safety seat 12, the back attachment straps 80 pass behind the child safety seat 12, along the outer shell 14 and act to hold the lateral side bolster flaps 46 in place along the outer shell 14.

At least one bottom attachment strap 82, such as an elastic strap, which acts as a fastener, is attached at the edge of the bottom lateral side bolster flaps 42 and connect the edge of one bottom lateral side bolster flap 42 to the edge of the opposite bottom lateral side bolster flap 42. Accordingly, when the pad or liner 10 is in place on the child safety seat 12, the bottom attachment strap 82 passes under the child safety seat 12, along the seat base 16 and acts to hold the bottom lateral side bolster flaps 42 in place along the outer shell 14.

Projecting beyond the seat back portion 38 is a top overwrap 55 configured to lie against the corresponding area of the outer shell 14 when the pad 10 is in place on the child safety seat 12. As shown in FIG. 9, the peripheral of the top overwrap 55 is preferably gathered, as by inclusion of elastic along the edge, so as to encourage the pad 10 to adapt closely to the curved contours of the child safety seat's outer shell 14 and to encourage the pad 10 to stay in place on the seat 12. The top overwrap 55 is preferably joined by the lateral side bolster flaps 46 along the side edges of the top overwrap 55 so that there is no break between the lateral side bolster flaps 46 and the top overwrap 55.

Figure 8:
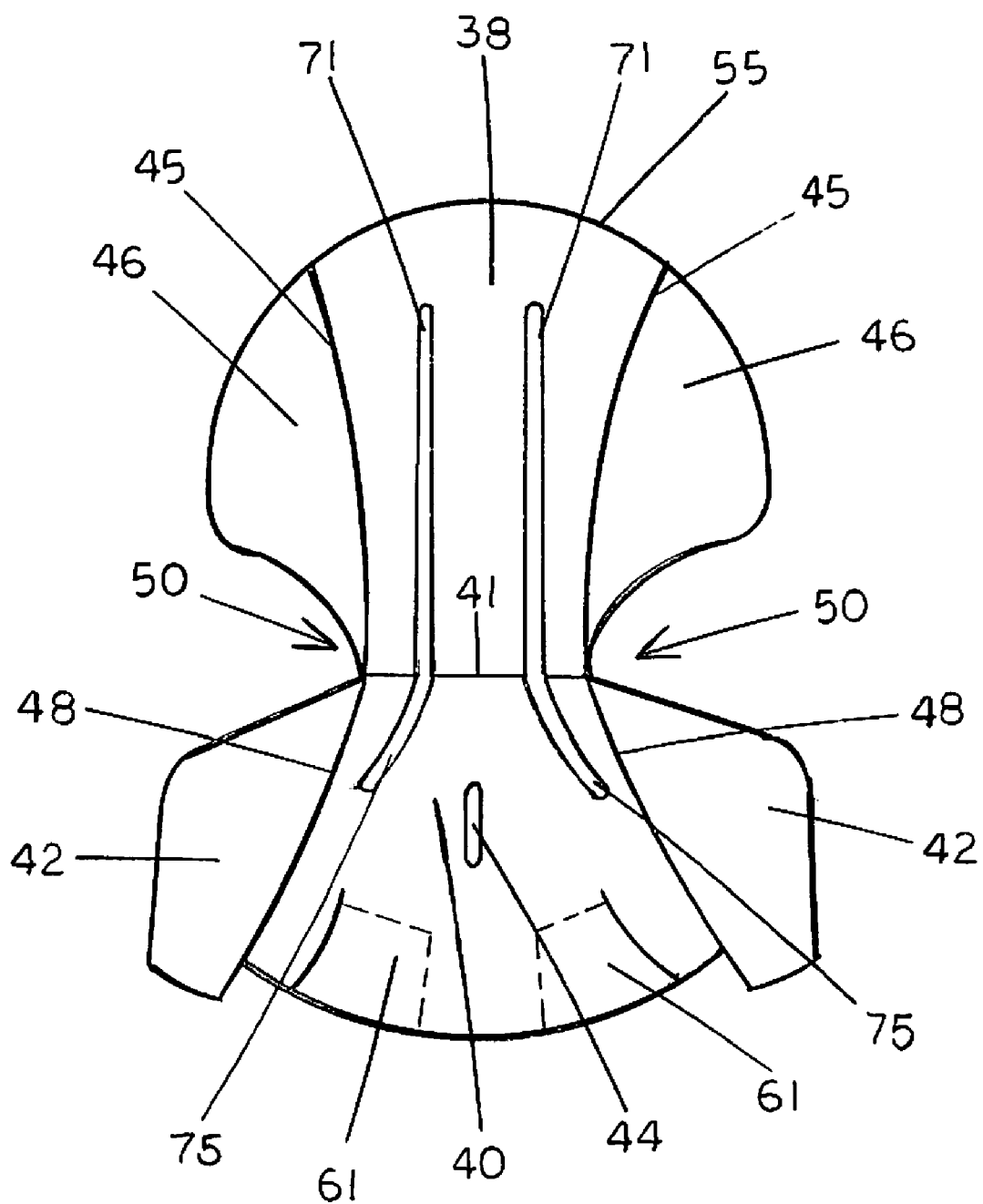
FIG. 8 is a front plan view of the pad or liner according to the second embodiment.
Figure 10:
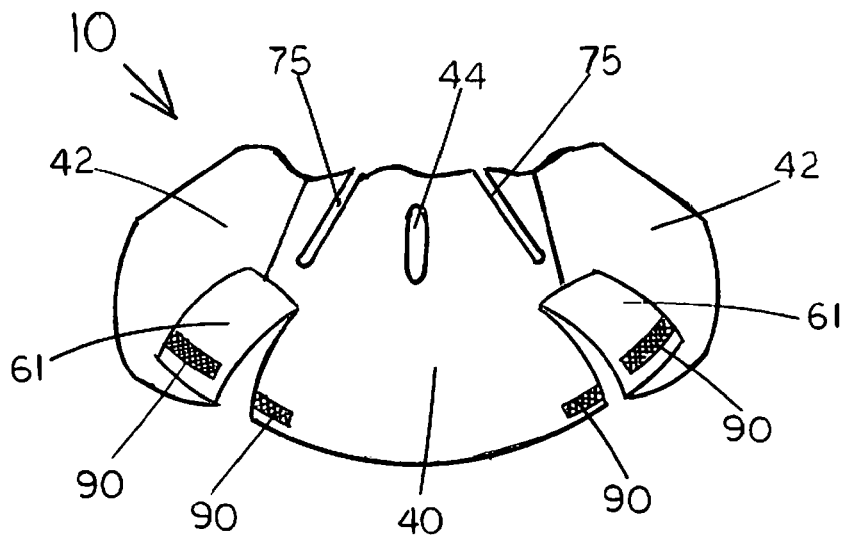
FIG. 10 is an enlarged, partial back plan view of the pad or liner according to the second embodiment.
Figure 11:
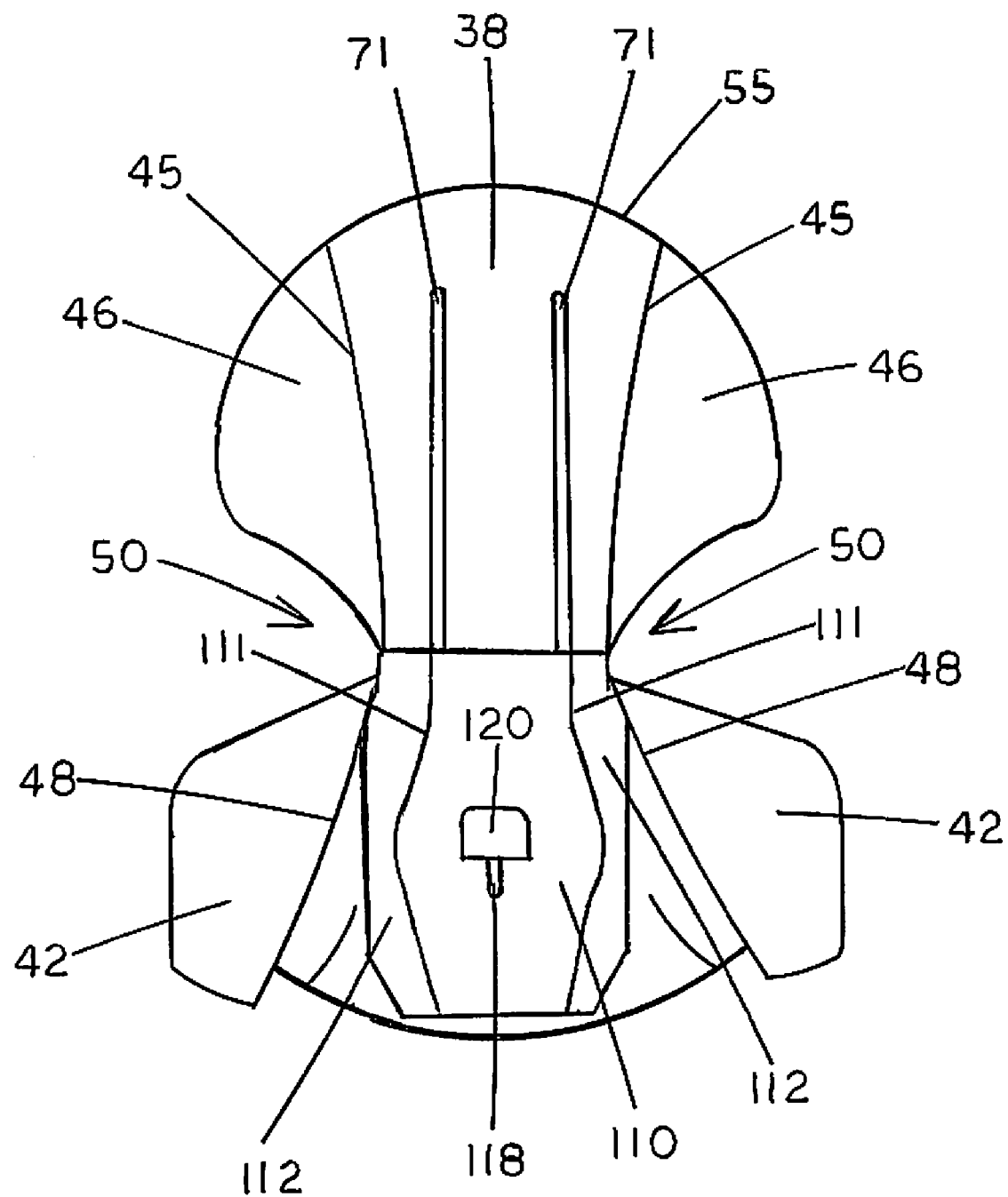
FIG. 11 is a front plan view of the pad or liner according to a third embodiment in which a smaller pad is included with the flap of the smaller pad raised.

Inwardly-directed underwraps 61 extend from the approximate mid length of each bottom lateral side bolster flap 42 and underlie a portion of the front of the seat bottom portion 40, as illustrated in FIG. 8. The underwraps 61 project beyond optional fold lines 48, which separate the seat bottom portion 40 from the bottom lateral side bolster flaps 42. Underwrap fasteners 90 are included along the lower edges of the underwraps 61 with corresponding or mating fastener portions 90 being included along the lower edges of the underlain portion of the front of the seat bottom portion 40, as shown in FIG. 10.

Preferably these underwrap fasteners 90 are hook and loop attachment mechanisms, but may alternatively be snaps, buttons, zippers, hooks, clips, or any other conventional fastening means.

A pair of substantially-parallel slits 71 extend down the seat back portion 38. When installing the pad 10, the substantially-parallel slits 71 are opened to provide apertures 74 registered with the pair of openings 32, 34, or 36 that are currently in use. Line fasteners 84 are included along the back of the pad 10 so as to selectively hold closed the substantially-parallel slits 71. The line fasteners 84 could be button and loop mechanisms, as shown in FIG. 9, or hook and loop mechanisms, zippers, or any other conventional slit closure means.

The essentially-parallel slits 71 extend to the juncture of the seat back portion 38 and the seat bottom portion 40, from which point a pair of divergent slits 75 extend forwardly across the seat bottom portion 40. The divergent slits 75 are openable to provide apertures 78 through which the lap webbings 24 extend.

For quick removal of a pad 10, one need only disconnect the back and bottom attachment straps 80, 82 and open the essentially-parallel slits 71 and divergent slits 75 in their entirety without disconnecting the two sides of the harness attachments.

If desired, one may attach the pad 10 to the seat 12 by opening the essentially-parallel slits 71 and the divergent slits 75, in their entirety and passing the harness webbing through.

It should be appreciated that the pad 10 of the second embodiment may also be configured with a seat bottom portion 40 and associated bottom lateral side bolster flaps 42, omitting the seat back portion 38. In such instance, the line 41 comprises the peripheral edge of the pad 10.

Thus, the second embodiment provides a washable and reusable full-sized pad or liner 10 for a child safety seat 12 while still allowing for the ease in installation and removability and flexibility in shoulder harness height.

Figure 12:
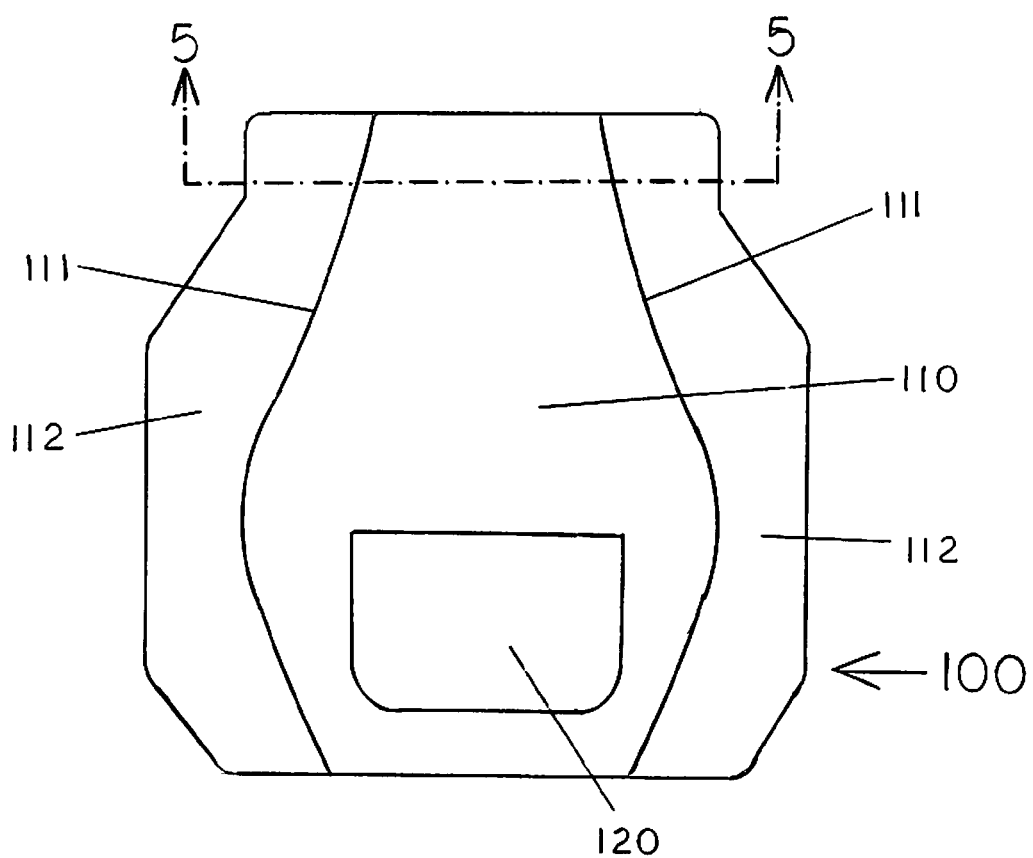
FIG. 12 is a front plan view of the smaller pad of the pad or liner according to the third embodiment with the flap of the smaller pad lowered.

A third embodiment of the pad 10 is shown in FIGS. 11 through 14. According to the third embodiment, a smaller pad 100 is included in the pad or liner 10 of the second embodiment. The smaller pad 100 may be either disposable or washable. In either configuration, the small pad 100 includes a pad seat bottom portion 110. In configurations in which the smaller pad 100 is disposable, the seat bottom portion 110 includes perforations 114 that may be separated to provide a pad buckle opening 118 (shown in FIG. 11) through which the buckle 26 can pass. In configurations in which the smaller pad 100 is washable, the seat bottom portion 110 includes simply the pad buckle opening 118. A flap 120 lays over the pad buckle opening 118 or seat belt tether perforation 114 so as to discourage any liquid spilled from passing through the opening 118 or perforation 114 to the pad 100 below. The flap 120 is configured to cover the pad buckle opening 118 or seat belt tether perforation 114 when not in use, such as when the small pad 100 is not secured to a child safety seat 12. As shown in FIG. 12, the flap 120 is also configured to at least partially overlap a section of the pad seat bottom portion 110.

In configurations which the smaller pad 100 is disposable, the pad seat bottom portion 110 of the smaller pad 100 has a thickness in the order of 2 mm to 10 mm, is comprised of an outer durable, yet liquid permeable layer 62, an absorbent core 64, and a base layer 66 formed of flexible liquid impermeable thermoplastic film. The absorbent core may be comprised of any of the absorbent fill materials previously mentioned. The peripheral edges of the pad seat bottom portion 110 are suitable bonded.

In configurations in which the smaller pad 100 is washable, the pad seat bottom portion 110 of the smaller pad 100 preferably contains an absorbent padding or batting between an outer layer and a base layer. In certain of such configurations, the other layer is a liquid-permeable cloth and the base layer is a liquid-impermeable cloth or washable plastic.

Figure 13:
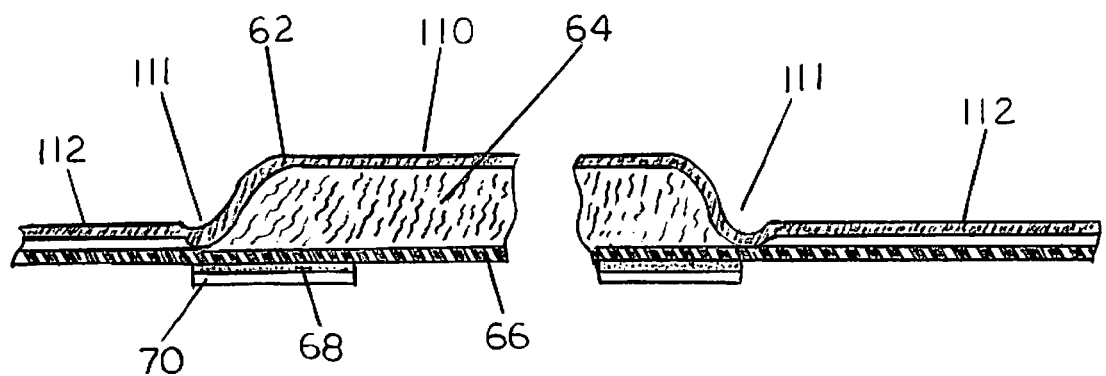
FIG. 13 is a greatly enlarged fragmentary sectional view through the smaller pad, the same being taken substantially along the line 5-5 in FIG. 12 and showing an absorbent core sandwiched between a durable porous liquid permeable outer layer and a liquid impervious base layer with peripheral portions of the pad seat bottom portion of the smaller pad overlaid with adhesive strips and a release tape.
Figure 14:
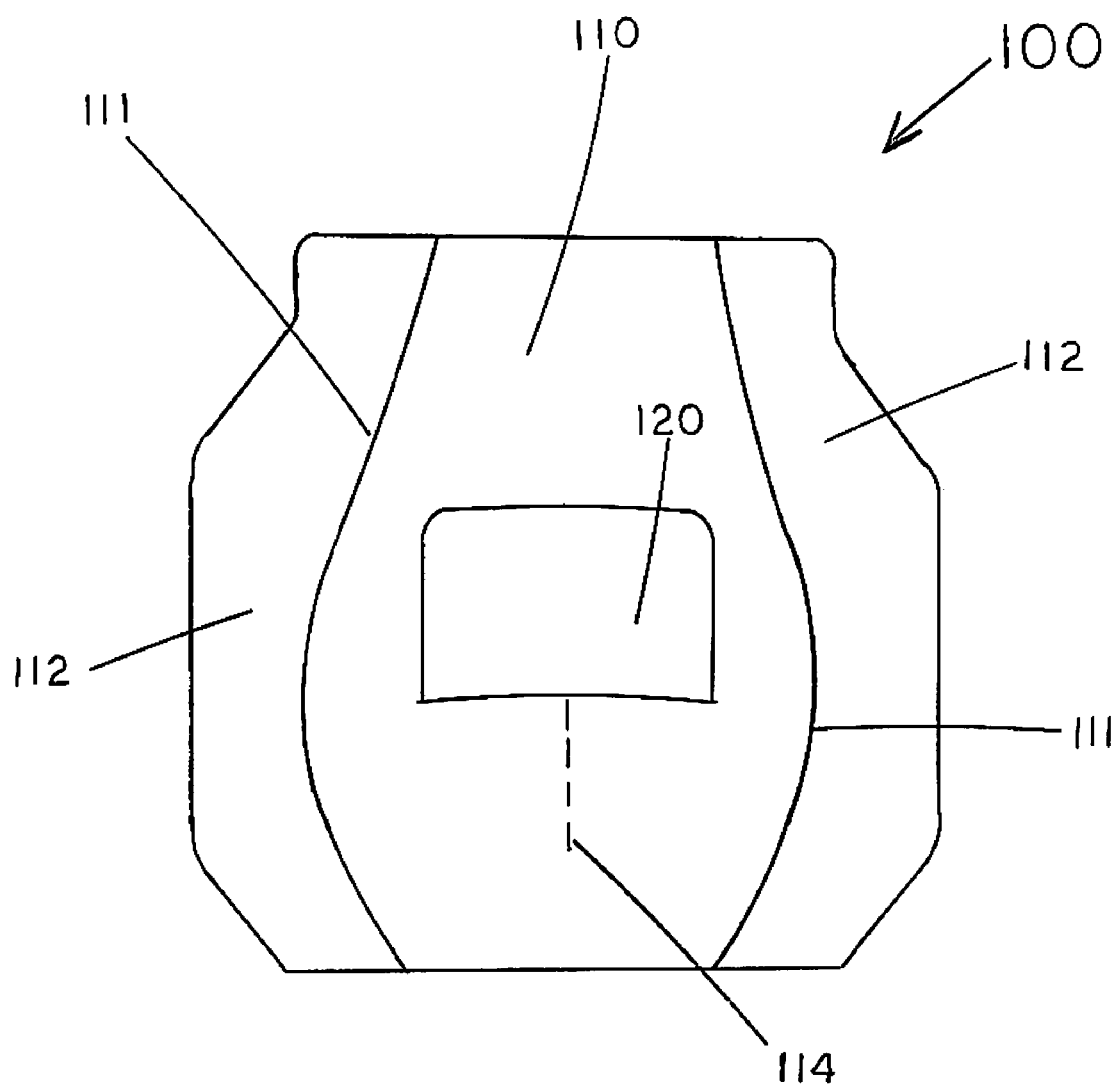
FIG. 14 is a front plan view of the smaller pad of the pad or liner according to the third embodiment with the flap of the smaller pad raised.

There is provided on the base layer 66, adjacent the peripheral areas of the pad seat bottom portion 110, and/or any other areas of the base layer 66, a suitable fastener for releasably securing the small pad 100 to the pad or liner 10 or, alternatively, to the child safety seat 12 itself. Preferably, the suitable fastener comprises a strip of contact or pressure sensitive adhesive 68 or a hook and loop tape fastener strip with mating strips secured to the seat 12 or the pad 10. Alternatively, the suitable fastener could be a snap, a zipper, a magnetic fastener, or any other convention attachment means. In embodiments in which a strip of contact or pressure sensitive adhesive 68 serves as the fastener, as shown in FIG. 13, a release tape 70 may overlie the strip 68 until such time as the small pad 100 is positioned for usage.

The small pad 100 further includes pad lateral bolster flaps 112 dimensioned to overlie the seat bottom lateral side bolster flaps 42 when the small pad 100 is in place on the full-sized pad or liner 10. The pad lateral bolster flaps 112 preferably adjoin peripheral edges of the pad seat bottom portion 110 at seam or fold lines 111, as shown in FIGS. 11 through 14. The small pad 100 may be alternatively placed directly on the child safety seat 12, in such case the pad lateral bolster flaps 112 are dimensioned to overlie the seat bottom side portions. In some embodiments in which the small pad 100 is configured to be disposable, the pad lateral bolster flaps 112 also contain the same liquid permeable outer layer 62, absorbent core 64, and base layer 66. The pad lateral bolster flaps 112 could further include the fastener such as a strip or strips of contact or pressure sensitive adhesive 68.

Thus, the pad 10 of the third embodiment provides a full-sized washable pad with a smaller pad section, which may be either disposable or washable, such that the entire pad need not be thrown out or washed in the event of a small spill in the bottom seat portion.

Since various possible embodiments might be made of the present invention and since various changes might be made in the exemplary embodiments set forth herein without departing from the spirit of the invention, it is to be understood that all matter herein described or shown in the accompanying drawings is to be interpreted as illustrative and not in the limiting sense.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A liner for a child safety seat having a bottom, bottom side portions, a back, back side portions, a top, safety harness webbing, and a buckle attached to a buckle tether, said liner comprising:
   a seat bottom portion adapted to overlie said bottom of said child safety seat, said seat bottom portion defining a pair of diverging slits configured to accommodate passage of said safety harness webbing therethrough, said seat bottom portion further defining a buckle slit configured to accommodate passage of said buckle and said buckle tether therethrough;
   a seat back portion adapted to overlie said back of said child safety seat, said seat back portion defining a pair of essentially-parallel slits adjoining and continuing said pair of diverging slits, said pair of essentially-parallel slits being configured to accommodate passage of said safety harness webbing therethrough;
   at least one fastener for releasably securing said liner to said child safety seat.

2. The liner for a child safety seat of claim 1, further comprising seat bottom bolster flaps dimensioned to overlie said bottom side portions of said child safety seat, and at least one of said fasteners being positioned on said liner near an outer edge of said bolster flaps.

3. The liner for a child safety seat of claim 2 wherein at least one of said fasteners comprises a strap configured to pass beneath said bottom of said child safety seat when said liner is in place upon said child safety seat.

4. The liner for a child safety seat of claim 1, further comprising a top overwrap extending from said seat back portion, said top overwrap being dimensioned to overlie said top of said child safety seat.

5. The liner for a child safety seat of claim 4, at least one of said fasteners positioned on said liner near said outer edge of said seat back bolster flaps comprises a strap configured to pass behind said back of said child safety seat when said liner is in place upon said child safety seat.

6. The liner for a child safety seat of claim 4, said seat back bolster flaps being separated from said seat bottom bolster flaps by a V-shaped notch.

7. The liner for a child safety seat of claim 1, further comprising seat back bolster flaps extending from said seat back portion, said seat back bolster flaps being dimensioned to overlie said back side portions of said child safety seat, and at least one of said fasteners being positioned on said liner near an outer edge of said seat back bolster flaps.

8. The liner for a child safety seat of claim 1, wherein said pair of essentially-parallel slits may be opened to provide apertures registered with selected safety seat harness anchor points.

9. The liner for a child safety seat of claim 1, wherein said pair of diverging slits may be opened to provide apertures registered with selected safety seat harness anchor points.

10. The liner for a child safety seat of claim 1, said liner being positioned on said child safety seat and being releasably secured thereto by said fasteners.

11. The liner for a child safety seat of claim 1, further comprising:
   a small disposable pad comprising
      a pad seat bottom portion adapted to overlie said seat bottom portion of said liner, said pad seat bottom portion comprising perforations whereby the perforations may be separated to provide a pad buckle opening configured to accommodate passage of said buckle and said buckle tether therethrough, said pad seat bottom portion comprising
         a liquid permeable outer layer;
         a core of liquid absorbent material; and
         a base layer of liquid impermeable material; and
      at least one fastener for releasably securing said small disposable pad to said liner.

12. The liner for a child safety seat of claim 11, said small disposable pad further comprising pad lateral bolster flaps dimensioned to overlie said seat bottom bolster flaps.

13. The liner for a child safety seat of claim 1, further comprising:
   a small pad comprising a pad seat bottom portion adapted to overlie said seat bottom portion of said liner, said pad seat bottom portion defining a pad buckle opening configured to accommodate passage of said buckle and said buckle tether therethrough; and at least one fastener for releasably securing said small disposable pad to said liner.

14. The liner for a child safety seat of claim 13, said small pad further comprising pad lateral bolster flaps dimensioned to overlie said seat bottom bolster flaps.

15. A liner for a child safety seat having a bottom, bottom side portions, a back, back side portions, a top, safety harness webbing, and a buckle attached to a buckle tether, said liner comprising:

a seat bottom portion adapted to overlie said bottom of said child safety seat, said seat bottom portion defining a pair of bottom slits configured to accommodate passage of said safety harness webbing therethrough, said seat bottom portion further defining a buckle slit configured to accommodate passage of said buckle and said buckle tether therethrough;

a seat back portion adapted to overlie said back of said child safety seat, said seat back portion defining a pair of essentially-parallel slits adjoining and continuing said pair of bottom slits, said pair of essentially-parallel slits being configured to accommodate passage of said safety harness webbing therethrough;

at least one fastener for releasably securing said liner to said child safety seat; and a small pad comprising a pad seat bottom portion adapted to overlie said seat bottom portion of said liner, said pad seat bottom portion comprising a pad buckle opening configured to accommodate passage of said buckle and said buckle tether therethrough; and at least one fastener for releasably securing said small pad to said liner;

wherein said pair of essentially-parallel slits may be opened to provide apertures registered with selected safety harness anchor points;

wherein said pair of bottom slits may be opened to provide apertures registered with selected safety harness anchor points; and where said buckle may be passed through said buckle slit and also subsequently passed through said pad buckle opening.

16. The liner for a child safety seat of claim 15, wherein said small pad further comprises an adhesive strip positioned on said base layer.

17. The liner for a child safety seat of claim 15, said liner being positioned on said child safety seat and being releasably secured thereto by said fasteners, said safety seat harness webbing extending through said pair of bottom slits and through said pair of essentially-parallel slits.

18. A small pad for a child safety seat having a bottom, bottom side portions, and a buckle, said small pad comprising:

a pad seat bottom portion adapted to overlie said bottom of said child safety seat, said pad seat bottom portion comprising a pad buckle opening configured to accommodate passage of said buckle therethrough;

at least one fastener for releasably securing said small pad to said child safety seat; and a flap connected to said pad seat bottom portion near said pad buckle opening and configured to cover said pad buckle opening when said small pad is not secured to said child safety seat, said flap being further configured to at least partially overlap a section of said pad seat bottom portion and to discourage passage of liquid through said pad buckle opening.

19. The small pad for a child safety seat of claim 18 further comprising lateral bolster flaps dimensioned to overlie said bottom side portions.

* * * * *